United States Patent
Narayanan et al.

(10) Patent No.: US 8,566,181 B2
(45) Date of Patent: Oct. 22, 2013

(54) INCORPORATING A REPAIR VENDOR INTO REPAIR PLANNING FOR SUPPLY CHAIN

(75) Inventors: Vasudevan Narayanan, Dallas, TX (US); Mohit Mohan, Irving, TX (US); Nikhil T. Jain, Flower Mound, TX (US); Amol B. Adgaonkar, Arlington, TX (US)

(73) Assignee: JDA Software Group, Inc., Scottsdale, AZ (US)

(*) Notice: Subject to any disclaimer, the term of this patent is extended or adjusted under 35 U.S.C. 154(b) by 1459 days.

(21) Appl. No.: 10/846,104

(22) Filed: May 14, 2004

(65) Prior Publication Data

US 2005/0228706 A1    Oct. 13, 2005

Related U.S. Application Data

(60) Provisional application No. 60/558,744, filed on Mar. 31, 2004.

(51) Int. Cl.
    *G06Q 10/00* (2012.01)
    *G06G 1/14* (2006.01)
    *G06Q 20/00* (2012.01)

(52) U.S. Cl.
    USPC ............................................. 705/28; 705/22

(58) Field of Classification Search
    USPC ............................................. 705/22, 26, 28
    See application file for complete search history.

(56) References Cited

U.S. PATENT DOCUMENTS

| | | | |
|---|---|---|---|
| 5,287,267 A | 2/1994 | Jayaraman et al. | 364/403 |
| 5,537,313 A * | 7/1996 | Pirelli | 705/28 |
| 5,765,143 A | 6/1998 | Sheldon et al. | 705/28 |
| 5,884,300 A * | 3/1999 | Brockman | 1/1 |
| 5,946,662 A * | 8/1999 | Ettl et al. | 705/7.26 |
| 5,953,707 A * | 9/1999 | Huang et al. | 705/7.25 |
| 5,974,395 A | 10/1999 | Bellini et al. | 705/9 |
| 6,151,582 A | 11/2000 | Huang et al. | 705/8 |
| 6,216,109 B1 * | 4/2001 | Zweben et al. | 705/7.12 |
| 6,324,522 B2 | 11/2001 | Peterson et al. | 705/28 |
| 6,430,541 B1 | 8/2002 | Brown et al. | 705/28 |
| 6,486,899 B1 | 11/2002 | Bush, Jr. | 345/855 |
| 6,531,238 B1 * | 3/2003 | King | 429/457 |
| 6,560,509 B2 | 5/2003 | Williams et al. | 700/216 |
| 6,937,992 B1 * | 8/2005 | Benda et al. | 705/7.26 |
| 6,952,680 B1 * | 10/2005 | Melby et al. | 705/28 |
| 7,376,600 B1 * | 5/2008 | Wadawadigi et al. | 705/28 |

(Continued)

OTHER PUBLICATIONS

Narayanan et al., "Incorporating a Repair Vendor into Repair Planning for a Supply Chain," U.S. Appl. No. 10/845,985, filed May 14, 2002.

(Continued)

*Primary Examiner* — Ig T An

(74) *Attorney, Agent, or Firm* — Jackson White, PC; Steven J. Laureanti

(57) ABSTRACT

One embodiment includes a computer-implemented system for incorporating a repair vendor into repair planning for a supply chain. The system accesses a logical representation of the supply chain, access an inventory plan for the supply chain, and generates a replenishment plan for meeting the inventory plan for the supply chain that includes suggested repair orders. Unserviceable parts in the supply chain are moved from the supply chain to the repair vendor, repaired at the repair vendor, and moved from the repair vendor back to the supply chain to meet the requirements for serviceable parts at the locations in the supply chain according to the suggested repair orders.

21 Claims, 3 Drawing Sheets

(56) References Cited

U.S. PATENT DOCUMENTS

| | | | |
|---|---|---|---|
| 2001/0034673 A1* | 10/2001 | Yang et al. | 705/28 |
| 2002/0120535 A1* | 8/2002 | Yu | 705/29 |
| 2002/0143598 A1* | 10/2002 | Scheer | 705/9 |
| 2003/0101107 A1* | 5/2003 | Agarwal et al. | 705/28 |
| 2004/0153379 A1* | 8/2004 | Joyce et al. | 705/28 |
| 2004/0181310 A1* | 9/2004 | Stashluk et al. | 700/226 |

OTHER PUBLICATIONS

Narayanan et al., "Planning a Supply of Items to a First Location Associated with a Supply Chain from One or More Second Locations Associated with the Supply Chain," U.S. Appl. No. 10/846,320, filed May 14, 2002.

* cited by examiner

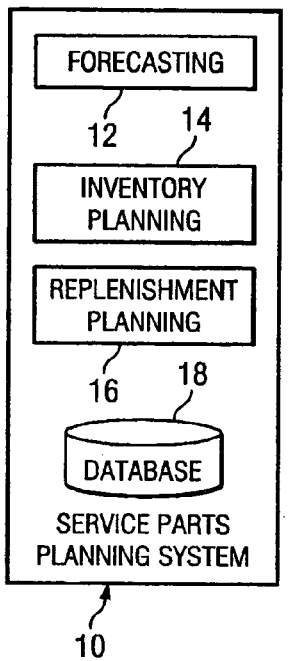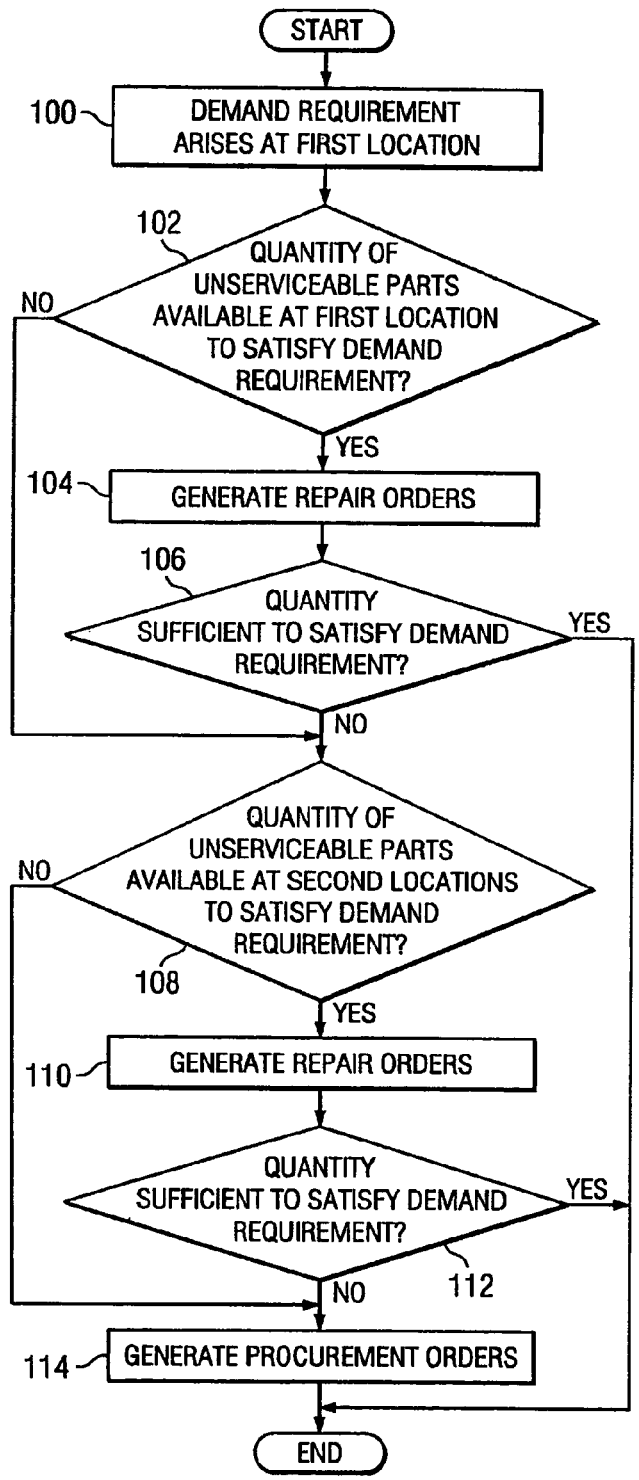

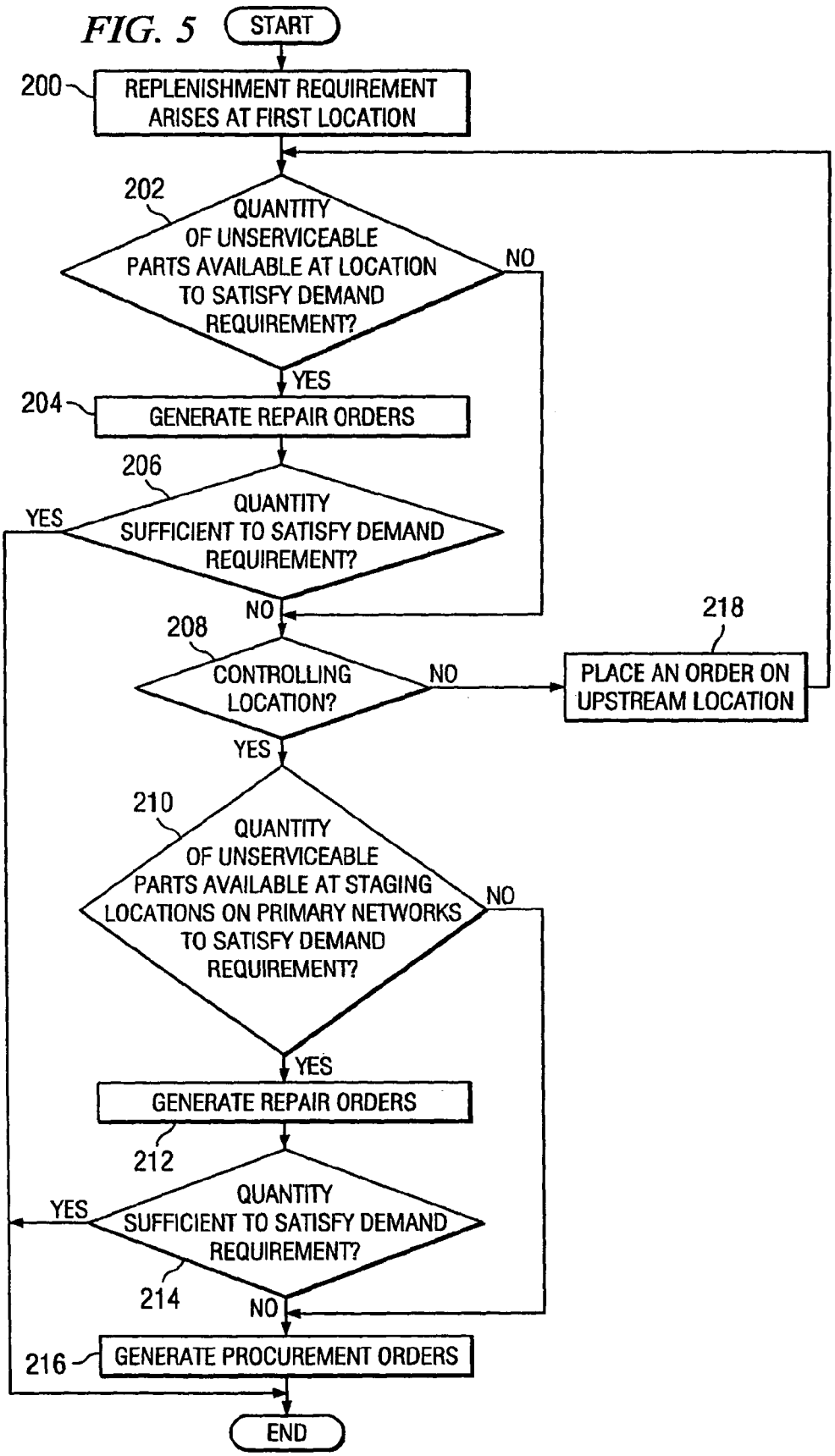

INCORPORATING A REPAIR VENDOR INTO REPAIR PLANNING FOR SUPPLY CHAIN

RELATED APPLICATION

This application is related to and claims the benefit of U.S. Provisional Application No. 60/558,744 filed Mar. 31, 2004.

TECHNICAL FIELD

This invention relates generally to repair planning and in particular to incorporating a repair vendor into repair planning for a supply chain.

BACKGROUND

A critical aspect of many supply chains is a network of repair locations that cooperate to receive, diagnose, and repair broken or otherwise unusable parts so that these parts can be returned to service and consumed similar to regular inventory. For example, a typical multi-level repair network may include, within a first level, a number of repair centers at a number of locations that receive, diagnose, and repair unusable parts and may each specialize in repairing a particular type of part. If a repair center is able to repair a part, then the repair center may repair the part and ship the repaired part to one of a number of stocking locations for consumption. If the repair center is unable to repair the part, however, then the part may need to be shipped to one of a number of central repair centers within a second level, which may each specialize in repairing a particular type of part, where the part is again received, diagnosed, and hopefully repaired. If the central repair center is able to repair a part, then the repair center may repair the part and ship the repaired part to an appropriate stocking location. If the central repair center is unable to repair the part, however, then the part may need to be further shipped to a vendor of the part within a third level (or perhaps at one or more higher levels), where the part is once again received, diagnosed, and hopefully repaired. If the vendor is able to repair a part, the vendor may repair the part and ship the repaired part to an appropriate stocking location or warehouse. If the vendor is unable to repair the part, however, the part may simply be discarded.

In certain industries, such repair processes may be very expensive, involving costs associated with temporary storage, diagnosis, and possibly repair of a part at each repair location in the repair network to which the part is shipped. Additional costs are incurred while a part remains unconsumed at a stocking location. Further costs must be incurred to ship a part between repair locations in the repair network. Repair planning involves attempts to minimize undesirable costs associated with broken or otherwise unusable parts to improve the cost-efficiency of the supply chain and increase overall profitability. Previous repair planning techniques have been inadequate in many supply chain environments.

SUMMARY OF THE INVENTION

According to the present invention, disadvantages and problems associated with previous techniques for repair planning may be reduced or eliminated.

One embodiment includes a computer-implemented system for incorporating a repair vendor into repair planning for a supply chain. The repair vendor is outside the supply chain and substantially independent of control from the supply chain. Unserviceable parts are moved from the supply chain to the repair vendor, repaired at the repair vendor, and moved back to the supply chain for use in the supply chain. The system includes one or more memory units and one or more processing units that collectively access a logical representation of the supply chain, access an inventory plan for the supply chain, and generate a replenishment plan for meeting the inventory plan for the supply chain that includes suggested repair orders. The suggested repair orders meet requirements for serviceable parts at locations in the supply chain. Unserviceable parts in the supply chain are moved from the supply chain to the repair vendor, repaired at the repair vendor, and moved from the repair vendor back to the supply chain to meet the requirements for serviceable parts at the locations in the supply chain according to the suggested repair orders. The suggested repair orders include start times according to which unserviceable parts are to be moved from the supply chain for repair at the repair vendor at the latest possible time allowing the unserviceable parts to be moved from the supply chain to the repair vendor, repaired at the repair vendor, and moved from the repair vendor back to the supply chain in time to meet the requirements for serviceable parts at the locations in the supply chain.

Particular embodiments of the present invention may provide one or more technical advantages. For example, particular embodiments allow a repair vendor that is outside a supply chain to be incorporated into repair planning for the supply chain. In particular embodiments, a repair plan may differentiate between "demand" requirements for repaired or otherwise serviceable parts, associated with fulfilling back orders, sales orders, and forecasted orders, and "replenishment" requirements for repaired or otherwise serviceable parts, associated with replenishing safety stock, at locations in a supply chain. In particular embodiments, such differentiation may enable an enterprise associated with the supply chain to minimize costs associated with carrying out repair orders and other operations to replenish safety stock, without unduly limiting the ability of the enterprise to carry out repair orders and other operations to fill back orders, sales orders, and forecasted orders. Particular embodiments may differentiate between controlling locations and staging locations in a supply chain. In particular embodiments, such differentiation may enable an enterprise to minimize costs associated with carrying out repair orders and other operations to replenish safety stock, without unduly limiting the ability of the enterprise to carry out repair orders and other operations to fill back orders, sales orders, and forecasted orders. In particular embodiments, such differentiation may enable an enterprise to minimize costs associated with supply chain operations independent of repair planning.

Certain embodiments of the present invention may provide all, some, or none of these technical advantages. Certain embodiments may provide one or more other technical advantages, one or more of which may be readily apparent to those skilled in the art from the figures, description, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 1 illustrates an example system for incorporating a repair vendor into repair planning for a supply chain;

FIG. 3 illustrates an example table of one or more controlling locations and staging locations in the supply chain;

FIG. 4 illustrates an example method for incorporating a repair vendor into repair planning for the supply chain; and FIG. 5 illustrates another example method for incorporating a repair vendor into repair planning for the supply chain.

DESCRIPTION OF EXAMPLE EMBODIMENTS

Figure 2:
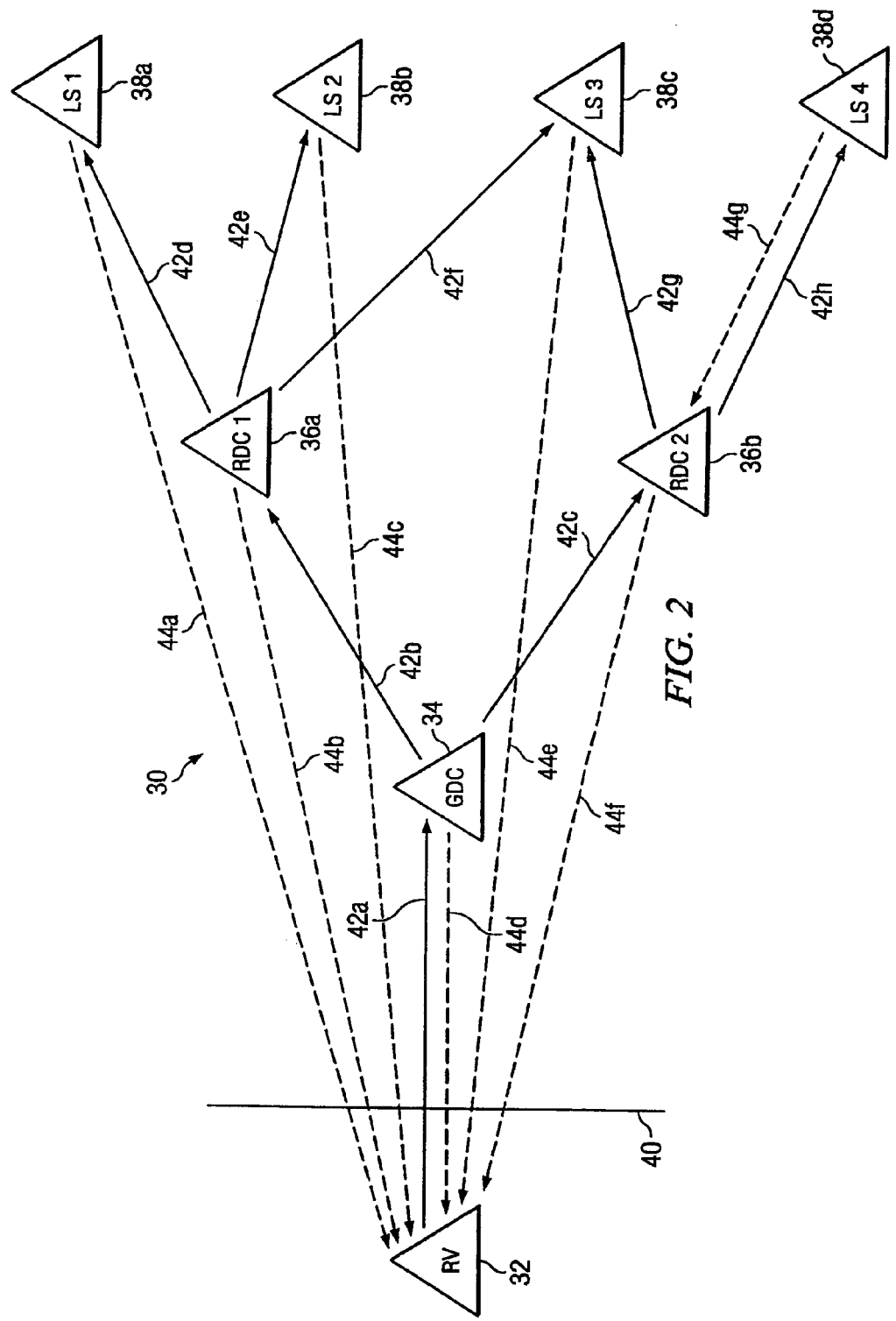
FIG. 2 illustrates an example supply chain and a repair vendor.

FIG. 1 illustrates an example system 10 for incorporating a repair vendor into repair planning for a supply chain. In particular embodiments, system 10 may include a service parts planning system. System 10 generates repair plans including suggested repair orders for repairing unserviceable parts. An unserviceable part is a part that is unusable or otherwise unserviceable and may have been unserviceable at manufacture or may have become unserviceable later during service. As described below, system 10 may generate one or more repair orders in response to a demand or replenishment requirement. At least certain repair orders may identify unserviceable parts for repair, specify a first location from which those unserviceable parts should be moved for repair, specify a second location to which those unserviceable parts should be moved for repair, and specify the dates on which those unserviceable parts should be moved. The repair orders may also specify logistics for moving those unserviceable parts.

In particular embodiments, system 10 includes a forecasting engine 12 that generates demand forecasts. A demand forecast may forecast orders for one or more parts received at one or more locations in a supply chain over a forecast period. Forecasting engine 12 may use any suitable forecasting technique to forecast orders.

System 10 may also include an inventory planning engine 14 that generates inventory plans. An inventory plan may suggest quantities of parts that should be available at certain locations in a supply chain at certain times to be available to meet demand at those locations at those times. Orders generate demand. For example, an order may include a back order (i.e. an existing order to be filled at a past time but not yet filled), a sales order (i.e. an existing order to be filled at a future time), or a forecasted order (i.e. an order to be filled at a future time that is forecasted but not yet received). Inventory planning engine 14 may use demand forecasts from forecasting engine 12 to generate inventory plans. An inventory plan may also suggest quantities of parts that should be available as safety stock at certain locations in a supply chain at certain times to be available to meet actual demand exceeding forecasted demand at those locations at those times.

System 10 may also include a replenishment planning engine 16 that generates replenishment plans. A replenishment plan may suggest one or more repair orders or procurement orders or a combination of both such orders for meeting an inventory plan. In particular embodiments, according to a replenishment plan, serviceable parts are supplied to one or more locations in a supply chain "on demand," which may, but need not necessarily, mean "just in time," in the sense that those parts reach those locations as late as possible to fill orders or replenish safety stock. Accordingly, in particular embodiments, repair orders for unserviceable parts may be timed so that those unserviceable parts are repaired as late as possible to satisfy an inventory plan.

In particular embodiments, system 10 is a server system including one or more computer systems. Engines 12, 14, and 16 may be processes that are separate from each other and are each executed on a dedicated processor. As an alternative, engines 12, 14, and 16 may be integrated with each other in whole or in part and may all be executed on the same processor. Engines 12, 14, and 16 may each receive input data from database 18 or elsewhere, manipulate the input data and other suitable data as appropriate, and interact with database 18 as appropriate to provide output data representing demand forecasts, inventory plans, and replenishment plans. Engines 12, 14, and 16 may be fully autonomous or may operate at least in part subject to input from users of system 10. Database 18 may provide persistent data storage for system 10 and may store any data suitable for operation of system 10. Although the term "database" is used, memory closely associated with one or more engines 12, 14, and 16 or another suitable data storage arrangement may be used. Use of the term "database" is meant to encompass all suitable data storage arrangements. In one embodiment, database 18 is populated with data received from one or more data sources internal, external, or both internal and external to an enterprise or facility associated with system 10.

FIG. 2 illustrates an example supply chain 30 and a repair vendor 32. In this example, supply chain 30 includes a global distribution center 34, two regional distribution centers 36, and four line stations 38. Although a particular supply chain 30 including particular numbers of particular locations is illustrated and described, the present invention contemplates any suitable supply chain 30 including any suitable numbers of any suitable locations. An enterprise or other boundary 40 separates repair vendor 32 from supply chain 30. As a result of boundary 40, repair vendor 32 operates independent of supply chain 30 and operations at repair vendor 32 may not be controlled from within supply chain 30. As an example and not by way of limitation, in particular embodiments, a first enterprise includes repair vendor 32, a second enterprise includes supply chain 30, and the first and second enterprises are separate from each other. Unserviceable parts may be sent from locations in supply chain 30 to repair vendor 32 for repair according to one or more service contracts between the first and second enterprises. In particular embodiments, repair vendor 32 is closely associated with a part manufacturer. As an example and not by way of limitation, a single enterprise may include repair vendor 32 and a part manufacturer. Repair vendor 32 may repair unserviceable parts manufactured by that part manufacturer.

Global distribution center 34 receives serviceable parts from one or more repair vendors 32 and distributes those parts downstream to one or more regional distribution centers 36. Global distribution center 34 may also receive serviceable parts procured from one or more other vendors (such as, for example, part manufacturers) and distribute those parts downstream to one or more regional distribution centers 36. Global distribution center 34 carries inventory to fill orders from regional distribution centers 36. For example, orders from regional distribution centers 36 may include back orders, sales orders, and forecasted orders. Inventory at global distribution center 34 may include (1) inventory for filling orders from regional distribution centers 36 and (2) safety stock. Safety stock includes inventory made available to fill orders exceeding forecasted orders. As an example and not by way of limitation, at time t, global distribution center 34 may have sales orders and back orders for one hundred fifty parts that need to be shipped from global distribution center 34 at time t+10. In addition, system 10 may forecast at time t that global distribution center 34 will receive at time t+10 orders for two hundred parts that will need to be shipped from global distribution center 34 at t+10. To meet the demand associated with the these back orders, sales orders, and forecasted orders, global distribution center 34 may plan at time t to have three hundred fifty parts in inventory at time t+10. Global distribution center 34 may also plan at time t to have a safety stock of fifty additional parts on hand at time t+10 to fill orders that may be received at time t+10 in excess of these back orders, sales orders, and forecasted orders.

In particular embodiments, a demand requirement exists at global distribution center 34 if inventory at global distribution center 34 is insufficient to fill orders (i.e. back orders, sales orders, and forecasted orders) from regional distribution centers 36. To satisfy the demand requirement, serviceable parts may be moved to global distribution center 34 in time (or, in particular embodiments, just in time) to fill those orders. One or more of these serviceable parts may be previously unserviceable parts moved from supply chain 30 to repair vendor 32 and repaired at repair vendor 32. In particular embodiments, a replenishment requirement exists at global distribution center 34 if safety stock at global distribution center 34 is below a predetermined threshold. To satisfy the replenishment requirement, serviceable parts may be moved to global distribution center 34 in time (or, in particular embodiments, as soon as possible) to bring safety stock at global distribution center 34 back up to the predetermined threshold. One or more of these serviceable parts may be previously unserviceable parts moved from supply chain 30 to repair vendor 32 and repaired at repair vendor 32. As described below, demand requirements may be handled differently from replenishment requirements. As an example and not by way of limitation, in particular embodiments, unserviceable parts may be moved to repair vendor 32 for repair from any location in supply chain 30 to satisfy a demand requirement, whereas unserviceable parts may be moved to repair vendor 32 for repair only from one or more certain locations in supply chain 30 to satisfy a replenishment requirement.

A regional distribution center 36 receives serviceable parts from global distribution center 34 and distributes those parts downstream to one or more line stations 38. Regional distribution center 36 carries inventory to fill orders from line stations 38. For example, orders from line stations 38 may include back orders, sales orders, and forecasted orders. Inventory at regional distribution center 36 may include (1) inventory for filling orders from line stations 38 and (2) safety stock. In particular embodiments, a demand requirement exists at regional distribution center 36 if inventory at regional distribution center 36 is insufficient to fill orders (i.e. back orders, sales orders, and forecasted orders) from line stations 38. To satisfy the demand requirement, serviceable parts may be moved to regional distribution center 36 in time (or, in particular embodiments, as soon as possible) to fill those orders. One or more of these serviceable parts may be previously unserviceable parts moved from supply chain 30 to repair vendor 32 and repaired at repair vendor 32. In particular embodiments, a replenishment requirement exists at regional distribution center 36 if safety stock at regional distribution center 36 is below a predetermined threshold. To satisfy the replenishment requirement, serviceable parts may be moved to regional distribution center 36 in time (or, in particular embodiments, as soon as possible) to bring safety stock at regional distribution center 36 back up to the predetermined threshold. One or more of these serviceable parts may be previously unserviceable parts moved from supply chain 30 to repair vendor 32 and repaired at repair vendor 32.

A line station 38 may receive serviceable parts from one or more regional distribution centers 36 and distribute those parts downstream to one or more consumers. In particular embodiments, line station 38 uses serviceable parts to manufacture finished goods for distribution to consumers. In particular embodiments, line station 38 uses serviceable parts to return equipment (such as, for example, airplanes) to service. Line station 38 may carry inventory to fill orders from consumers. For example, orders from consumers may include back orders, sales orders, and forecasted orders. Inventory at line station 38 may include (1) inventory for filling orders from consumers and (2) safety stock. In particular embodiments, a demand requirement exists at line station 38 if inventory at line station 38 is insufficient to fill orders (i.e. back orders, sales orders, and forecasted orders) from consumers. To satisfy the demand requirement, serviceable parts may be moved to line station 38 in time (or, in particular embodiments, as soon as possible) to fill those orders. One or more of these serviceable parts may be previously unserviceable parts moved from supply chain 30 to repair vendor 32 and repaired at repair vendor 32. In particular embodiments, a replenishment requirement exists at line station 38 if safety stock at line station 38 is below a predetermined threshold. To satisfy the replenishment requirement, serviceable parts may be moved to line station 38 in time (or, in particular embodiments, as soon as possible) to bring safety stock at regional distribution center 36 back up to the predetermined threshold. One or more of these serviceable parts may be previously unserviceable parts moved from supply chain 30 to repair vendor 32 and repaired at repair vendor 32.

Serviceable parts may be moved downstream from a first location to a second location according to a forward bill of distribution (BOD) 42. As an example and not by way of limitation, repaired parts at repair vendor 32 may be moved from repair vendor 32 to global distribution center 34 according to forward BOD 42a. Although forward BODs 42 terminating at regional distribution centers 36 are illustrated and described as originating only from global distribution center 34 and forward BODs 42 terminating at line stations 38 are illustrated and described as originating only from regional distribution centers 36, the present invention contemplates any suitable forward BODs 42 between any suitable locations in supply chain 30. As an example and not by way of limitation, in particular embodiments, a regional distribution center 36 may receive serviceable parts directly from repair vendor 32 according to a forward BOD 42 between repair vendor 32 and regional distribution center 36.

If a location terminates only one forward BOD 42, forward BOD 42 is a primary forward BOD 42. As an example and not by way of limitation, because global distribution center 34 terminates only one forward BOD 42a, forward BOD 42a is a primary forward BOD 42. As another example, because line station 38b terminates only one forward BOD 42e, forward BOD 42e is a primary forward BOD 42. If a location terminates multiple forward BODs 42, one forward BOD 42 terminating at that location is a primary forward BOD 42. All other forward BODs 42 terminating at that location are secondary forward BODs 42f and 42g. As an example and not by way of limitation, line station 38c terminates two forward BODs 42f and 42g. Forward BOD 42g may be a primary forward BOD 42, and forward BOD 42f may be a secondary forward BOD 42. A forward BOD 42 between two locations in supply chain 30 may be designated a primary forward BOD 42 according to one or more criteria. As an example and not by way of limitation, if costs associated with moving serviceable parts from regional distribution center 36a to line station 38c according to forward BOD 42f are more than costs associated with moving serviceable parts from regional distribution center 36b to line station 38c according to forward BOD 42g, forward BOD 42g may be designated a primary forward BOD 42 and forward BOD 42f may be designated a secondary forward BOD 42.

Unserviceable parts may be moved upstream from a first location to a second location according to a reverse BOD 44. Unserviceable parts may be moved upstream for repair. As an example and not by way of limitation, unserviceable parts at line station 38*a* may be moved from line station 38*a* to repair vendor 32 according to reverse BOD 44*a*. As another example, unserviceable parts at line station 38*d* may be moved from line station 38*d* to regional distribution center 36*b* according to reverse BOD 44*g* and then from regional distribution center 36*b* to repair vendor 32 according to reverse BOD 44*f*. Reverse BODs 44 may be assigned lane priorities. As an example and not by way of limitation, reverse BOD 44*d* may be assigned a highest lane priority; reverse BOD 44*b* may be assigned a next-highest lane priority after reverse BOD 44*d*; reverse BOD 44*f* may be assigned a next-highest lane priority after reverse BOD 44*b*; reverse BOD 44*a* may be assigned a next-highest lane priority after reverse BOD 44*f*; reverse BOD 44*c* may be assigned a next-highest lane priority after reverse BOD 44*a*; reverse BOD 44*e* may be assigned a next-highest lane priority after reverse BOD 44*c*; and reverse BODs 44*g* and 44*f* may collectively be assigned a lowest priority.

Reverse BODs 44 may be assigned lane priorities according to one or more criteria. As an example and not by way of limitation, reverse BODs 44 may be assigned the above lane priorities because costs associated with moving unserviceable parts from global distribution center 34 to repair vendor 32 according to reverse BOD 44*d* may be less than costs associated with moving unserviceable parts from any other location in supply chain 30 to repair vendor 32 according to any other reverse BOD 44; costs associated with moving unserviceable parts from regional distribution center 36*a* to repair vendor 32 according to reverse BOD 44*b* may be less than costs associated with moving unserviceable parts from any other location in supply chain 30 to repair vendor 32 according to any other reverse BOD 44, except costs associated with moving unserviceable parts from global distribution center 34 to repair vendor 32 according to reverse BOD 44*d*; and so on. As described below, system 10 may use lane priorities to determine locations from which unserviceable parts should be moved to repair vendor 32 for repair to satisfy a demand or replenishment requirement.

A primary network includes a series of one or more forward BODs 42 connecting two or more locations. As an example and not by way of limitation, a first primary network illustrated in FIG. 2 includes forward BODs 42*a* and 42*b*. This first primary network connects global distribution center 34 and regional distribution center 36*a*. As another example, a second primary network illustrated in FIG. 2 includes forward BODs 42*a*, 42*b*, and 42*e*. This second primary network connects global distribution center 34, regional distribution center 36*a*, and line station 38*b*. As another example, a third primary network illustrated in FIG. 2 includes forward BODs 42*a*, 42*c*, and 42*g*. This third primary network connects global distribution center 34, regional distribution center 36*b*, and line station 38*c*. Because forward BOD 42*f* is a secondary forward BOD 42, a primary network does not connect global distribution center 34, regional distribution center 36*a* and line station 38*c*.

A location in supply chain 30 may be a staging location. A location in supply chain 30 is a staging location if that location meets all of one or more certain conditions. In particular embodiments, a location in supply chain 30 is a staging location if (1) serviceable parts can be moved downstream from repair vendor 32 to that location, (2) serviceable parts must traverse more than one forward BOD 42 to make their way downstream from repair vendor 32 to that location, (3) serviceable parts need not traverse a secondary forward BOD 42 to make their way downstream from repair vendor 32 to that location, (4) unserviceable parts can be moved upstream from that location to repair vendor 32, and (5) unserviceable parts need not traverse more than one reverse BOD 44 to make their way upstream from that location to repair vendor 32. In these embodiments, if a location in supply chain 30 fails to meet one or more of these conditions, that location is not a staging location. As an example and not by way of limitation, because serviceable parts need not traverse more than one forward BOD 42 to make their way from repair vendor 32 to global distribution center 34, global distribution center 34 is not a staging location. Because serviceable parts must traverse more than one reverse BOD 44 to make their way upstream from line station 38*d* to repair vendor 32, line station 38*d* is not a staging location. Because regional distribution centers 36*a* and 36*b* and line stations 38*a*, 38*b*, and 38*c* each meet the five conditions above, regional distribution centers 36*a* and 36*b* and line stations 38*a*, 38*b*, and 38*c* are each staging locations.

A location in supply chain 30 may be a controlling location. A location in supply chain 30 is a controlling location if that location meets one or more certain conditions. In particular embodiments, a location in supply chain 30 is a controlling location if (1) serviceable parts can be moved downstream from repair vendor 32 to that location and (2) serviceable parts need not traverse more than one forward BOD 42 to make their way downstream from repair vendor 32 to that location. In these embodiments, if a location in supply chain 30 fails to meet one or more of these conditions, that location is not a controlling location. As an example and not by way of limitation, because serviceable parts can be moved downstream from repair vendor 32 to global distribution center 34 and need only traverse forward BOD 42*a* to make their way from repair vendor 32 to global distribution center 34, global distribution center 34 is a controlling location. As another example, because serviceable parts must traverse more than one forward BOD 42 to make their way from repair vendor 32 to line station 38*d*, line station 38*d* is not a controlling station.

System 10 may generate one or more repair orders in response to a demand requirement at a location in supply chain 30. An inventory plan may indicate one or more demand requirements. In particular embodiments, system 10 may generate the repair orders according to the following rules. If a quantity of unserviceable parts at that location is available to satisfy the demand requirement, unserviceable parts available to satisfy the demand requirement should be moved from that location to repair vendor 32 for repair. If the quantity of unserviceable parts at that location available to satisfy the demand requirement is insufficient to fully satisfy the demand requirement, unserviceable parts available to satisfy the demand requirement should be moved from other locations in supply chain 30 to repair vendor 32 for repair. Unserviceable parts are to be moved from those other locations to repair vendor 32 according to lane priority. If the aggregate quantity of unserviceable parts at all these locations available to satisfy the demand requirement is insufficient to fully satisfy the demand requirement, serviceable parts needed to satisfy the demand requirement may be procured from one or more vendors outside supply chain 30 according to vendor priority. In particular embodiments, serviceable parts may be procured from more than one vendor outside supply chain 30 to satisfy the demand requirement.

As an example and not by way of limitation, assume regional distribution center 36*a* has a demand requirement of twenty parts and has eleven unserviceable parts on hand, global distribution center 34 has five unserviceable parts on hand, and regional distribution center 36*b* has thirty unserviceable parts on hand. Reverse BOD 44*d* has a highest lane priority, reverse BOD 44*b* has a second highest lane priority, and reverse BOD 44*f* has a third highest lane priority. In response to the demand requirement at regional distribution center 36a, system 10 generates three repair orders. According to the three repair orders, the eleven unserviceable parts at regional distribution center 36a, the five unserviceable parts at global distribution center 34, and four of the thirty unserviceable parts at regional distribution center 36b are to be moved to repair vendor 32 for repair and then moved from repair vendor 32 to regional distribution center 36a to satisfy the demand requirement.

System 10 may generate one or more repair orders in response to a replenishment requirement at a location in supply chain 30. An inventory plan may indicate one or more replenishment requirements. System 10 may generate the repair orders according to the following rules.

If the location at which the replenishment requirement exists is a controlling location, a first set of rules applies. In particular embodiments, according to the first set of rules, if a quantity of unserviceable parts at the controlling location is available to satisfy the replenishment requirement, unserviceable parts available to satisfy the replenishment requirement should be moved from that controlling location to repair vendor 32 for repair. If the quantity of unserviceable parts at that controlling location available to satisfy the replenishment requirement is insufficient to fully satisfy the replenishment requirement, unserviceable parts available to satisfy the replenishment requirement should be moved from one or more staging locations to repair vendor 32 for repair. Unserviceable parts are to be moved from those staging locations to repair vendor 32 according to lane priority. Unserviceable parts may be moved from a staging location only if a primary network connects that staging location to the controlling location. If an aggregate quantity of unserviceable parts at the controlling location and at these staging locations available to satisfy the replenishment requirement is insufficient to fully satisfy the replenishment requirement, serviceable parts needed to satisfy the replenishment requirement may be procured from a highest-priority vendor outside supply chain 30. In particular embodiments, serviceable parts may not be procured from more than one vendor outside supply chain 30 to satisfy the replenishment requirement.

If the location at which the replenishment requirement exists is a staging location, a second set of rules applies. In particular embodiments, according to the second set of rules, if a quantity of unserviceable parts at the staging location is available to satisfy the replenishment requirement, unserviceable parts available to satisfy the replenishment requirement should be moved from that staging location to repair vendor 32 for repair. If the quantity of unserviceable parts at that staging location available to satisfy the replenishment requirement is insufficient to fully satisfy the replenishment requirement, unserviceable parts available to satisfy the replenishment requirement should be moved from one or more other locations in supply chain 30 to repair vendor 32 for repair. Unserviceable parts are to be moved from those other locations in supply chain 30 to repair vendor 32 according to lane priority. Unserviceable parts may be moved from another location in supply chain 30 only if a primary network connects that other location to the staging location. If an aggregate quantity of unserviceable parts at the staging location and at these other locations available to satisfy the replenishment requirement is insufficient to fully satisfy the replenishment requirement, serviceable parts needed to satisfy the replenishment requirement may be procured from a highest-priority vendor outside supply chain 30. In particular embodiments, serviceable parts may not be procured from more than one vendor outside supply chain 30 to satisfy the replenishment requirement.

As an example and not by way of limitation, assume global distribution center 34 has a replenishment requirement of twenty parts and has eleven unserviceable parts on hand, regional distribution center 36a has five unserviceable parts on hand, and regional distribution center 36b has thirty unserviceable parts on hand. Reverse BOD 44d has a highest lane priority, reverse BOD 44b has a second highest lane priority, and reverse BOD 44f has a third highest lane priority. Global distribution center 34 is a controlling location. Regional distribution centers 36a and 36b and line stations 38a, 38b, and 38c are all staging locations and are each connected to global distribution center 34 by a primary network. Accordingly, unserviceable parts may be moved from one or more of regional distribution centers 36a and 36b and line stations 38a, 38b, and 38c to repair vendor 32 for repair to satisfy the replenishment requirement. In response to the replenishment requirement, system 10 generates three repair orders. According to the repair orders, the eleven unserviceable parts at global distribution center 34, the five unserviceable parts at regional distribution center 36a, and four of the thirty unserviceable parts at regional distribution center 36b are to be moved to repair vendor 32 for repair and then moved from repair vendor 32 to global distribution center 34 to satisfy the replenishment requirement.

As another non-limiting example, assume regional distribution center 36a has a replenishment requirement of twenty parts and has eleven unserviceable parts on hand, global distribution center 34 has five unserviceable parts on hand, and line station 38b has thirty unserviceable parts on hand. Reverse BOD 44d has a highest lane priority, reverse BOD 44b has a second highest lane priority, and reverse BOD 44c has a third highest lane priority. Global distribution center 34 is a controlling location. Regional distribution centers 36a and 36b and line stations 38a, 38b, and 38c are all staging locations. Global distribution center 34 and line stations 38a and 38b are each connected to regional distribution center 36a by a primary network. Accordingly, unserviceable parts may be moved from one or more of global distribution center 34 and line stations 38a and 38b to repair vendor 32 for repair to satisfy the replenishment requirement. In response to the replenishment requirement, system 10 generates three repair orders. According to the three repair orders, the eleven unserviceable parts at regional distribution center 36a, the five unserviceable parts at global distribution center 34, and four of the thirty unserviceable parts at line station 38b are to be moved to repair vendor 32 for repair and then moved from repair vendor 32 to regional distribution center 36a to satisfy the replenishment requirement.

A repair order for one or more unserviceable parts may take into consideration one or more lead times associated with those unserviceable parts. As an example and not by way of limitation, an unserviceable part at a first location in supply chain 30 is not available to satisfy a demand requirement unless there is enough time to move the part from the first location to repair vendor 32, repair the part at repair vendor 32, and move the part from repair vendor 32 to a second location corresponding to the demand requirement. As another example, an unserviceable part at a first location in supply chain 30 is not available to satisfy a replenishment requirement unless there is enough time to move the part from the first location to repair vendor 32, repair the part at repair vendor 32, and move the part from repair vendor 32 to a second location corresponding to the demand requirement.

Although in particular embodiments system 10 may generate repair orders based on both demand requirements and replenishment requirements and system 10 may differentiate between demand requirements and replenishments requirements, in other embodiments system 10 may generate repair orders only based on demand requirements or may apply the present invention only in connection with demand requirements. Similarly, in other embodiments system 10 may generate repair orders only based on replenishment requirements or may apply the present invention only in connection with replenishment requirements. In still other embodiments, system 10 may generate repair orders without differentiating between demand requirements and replenishment requirements (e.g., treating all requirements for serviceable parts as being of the same type and performing the same operations according to the same rules for all such requirements).

Although it is desirable in particular embodiments to generate repair orders based in part on identification of and differentiation between controlling locations and staging locations, in other embodiments system 10 may generate repair orders without any such identification or differentiation. In such embodiments, to meet a demand requirement or replenishment requirement at a first location in supply chain 30, system 10 may generate one or more repair orders according to which unserviceable parts are moved from the first location or one or more second locations in supply chain 30 to repair vendor 32 for repair without determining whether any of the first location and the one or more second locations are controlling locations or staging locations.

Although system 10 is illustrated and described as generating repair orders according to whether locations in supply chain 30 are controlling locations or staging locations, identification and differentiation between controlling locations and staging locations is not limited to the repair planning. Such identification and differentiation may be desirable in connection with any suitable planning for supply chain 30. As an example and not by way of limitation, in particular embodiments, system 10 may generate a plan for moving serviceable parts from one or more first locations in supply chain 30 to one or more second locations in supply chain 30 for use at the one or more second locations in supply chain 30 according to whether the first locations and second locations are controlling locations or staging locations.

FIG. 3 illustrates an example table 50 of one or more controlling locations and staging locations in supply chain 30. System 10 may access information representing supply chain 30 and generate table 50 using that information. Table 50 may be stored in database 18. To generate table 50, system 10 may determine whether each location in supply chain 30 is a controlling location or a staging location and assign the location to either controlling column 52a or staging column 52b. Although a particular table 50 containing particular information regarding controlling locations and staging locations in supply chain 30 is illustrated and described, the present invention contemplates any suitable table 50 or other data arrangement containing any suitable information regarding controlling locations and staging locations in supply chain 30. System 10 may use the rules described above to determine whether a location is a controlling location or a staging location. After system 10 has generated table 50, system 10 may access table 50 as needed to determine whether one or more locations in supply chain 30 are controlling locations or staging locations in connection with generating repair orders or other planning for supply chain 30, as described above. System 10 may update table 50 as changes are made to supply chain 30, according to particular needs.

FIG. 4 illustrates an example method for incorporating a repair vendor 32 into repair planning for supply chain 30. The method begins at step 100, where a demand requirement arises at a location ("demand location") in supply chain 30. At step 102, in response to the demand requirement, system 10 determines whether one or more unserviceable parts are available at the demand location to satisfy the demand requirement. If one or more unserviceable parts are available at the demand location to satisfy the demand requirement, the method proceeds to step 104. At step 104, system 10 generates one or more repair orders for one or more unserviceable parts at the demand location. As described above, according to the repair orders, the unserviceable parts are to be moved from the demand location to repair vendor 32, repaired at repair vendor 32, and moved from repair vendor 32 to the demand location. In particular embodiments, it is not necessary to move the unserviceable parts to repair vendor 32. In at least some of these embodiments, if at all possible, the unserviceable parts are repaired at the demand location instead of being moved to repair vendor 32 for repair. At step 106, system 10 determines whether those repair orders are sufficient to satisfy the demand requirement. If the repair orders are sufficient to satisfy the demand requirement, the method ends. If the repair orders are not sufficient to satisfy the demand requirement, the method proceeds to step 108. Returning to step 102, if one or more unserviceable parts are not available at the demand location to satisfy the demand requirement, the method proceeds to step 108.

At step 108, system 10 determines whether one or more unserviceable parts are available at one or more locations in supply chain 30 other than the demand location to satisfy the demand requirement. If one or more unserviceable parts are available at one or more other locations to satisfy the demand requirement, the method proceeds to step 110. At step 110, system 10 generates one or more repair orders for one or more unserviceable parts at one or more other locations. As described above, according to the repair orders, those unserviceable parts are to be moved from those other locations to repair vendor 32, repaired at repair vendor 32, and moved from repair vendor 32 to the demand location. At step 112, system 10 determines whether those repair orders are sufficient to satisfy the demand requirement. If the repair orders are sufficient to satisfy the demand requirement, the method ends. If the repair orders are not sufficient to satisfy the demand requirement, the method proceeds to step 114. At step 114, system 10 generates one or more procurement orders according to which serviceable parts are to be procured to satisfy the demand requirement, and the method ends. Returning to step 108, if one or more unserviceable parts are not available at one or more other locations in supply chain 30 to satisfy the demand requirement, the method proceeds to step 114. Although the steps of the method illustrated in FIG. 4 are illustrated and described as occurring in a particular order, the present invention contemplates any suitable steps of the method illustrated in FIG. 4 occurring in any suitable order.

FIG. 5 illustrates another example method for incorporating a repair vendor 32 into repair planning for supply chain 30. The method begins at step 200, where a replenishment requirement arises at a location ("replenishment location") in supply chain 30. At step 202, in response to the replenishment requirement, system 10 determines whether one or more unserviceable parts are available at the replenishment location to satisfy the replenishment requirement. If one or more unserviceable parts are available at the replenishment location to satisfy the replenishment requirement, the method proceeds to step 204. At step 204, system 10 generates one or more repair orders for one or more unserviceable parts at the replenishment location. As described above, according to the repair orders, the unserviceable parts are to be moved from the replenishment location to repair vendor 32, repaired at repair vendor 32, and moved from repair vendor 32 to the replenishment location. At step 206, system 10 determines whether those repair orders are sufficient to satisfy the replenishment requirement. If the repair orders are sufficient to satisfy the replenishment requirement, the method ends. If the repair orders are not sufficient to satisfy the replenishment requirement, the method proceeds to step 208. Returning to step 202, if one or more unserviceable parts are not available at the replenishment location to satisfy the replenishment requirement, the method proceeds to step 208.

At step 208, system 10 determines whether the replenishment location is a controlling location. If the replenishment location is a controlling location, the method proceeds to step 210. At step 210, system 10 determines whether one or more unserviceable parts are available at one or more staging locations connected to the replenishment location by one or more primary networks to satisfy the replenishment requirement. If one or more unserviceable parts are available at one or more staging locations connected to the replenishment location by one or more primary networks to satisfy the replenishment requirement, the method proceeds to step 212. At step 212, system 10 generates one or more repair orders for one or more unserviceable parts at one or more of those staging locations. As described above, according to the repair orders, unserviceable parts are to be moved from those staging locations to repair vendor 32, repaired at repair vendor 32, and moved from repair vendor 32 to the replenishment location. At step 214, system 10 determines whether those repair orders are sufficient to satisfy the replenishment requirement. If the repair orders are sufficient to satisfy the replenishment requirement, the method ends. If the repair orders are not sufficient to satisfy the replenishment requirement, the method proceeds to step 216. At step 216, system 10 generates a procurement order to satisfy the replenishment requirement. As described above, in particular embodiments, serviceable parts may not be procured from more than one vendor to satisfy the replenishment requirement, even if that one vendor cannot fully satisfy the replenishment requirement. Returning to step 210, if one or more unserviceable parts are not available at one or more staging locations connected to the replenishment location by one or more primary networks to satisfy the replenishment requirement, the method proceeds to step 216. Returning to step 208, if the replenishment location is not a controlling location, the method proceeds to step 218. At step 218, system 10 generates places an order at a location in supply chain 30 immediately upstream from the replenishment location. The method then returns to step 202, where system 10 determines whether one or more unserviceable parts are available at the upstream location to satisfy the replenishment requirement at the replenishment location. The method iteratively proceeds through steps 202-208 and 218 until a controlling location is reached, at which point the method proceeds to step 210, as described above. Although the steps of the method illustrated in FIG. 5 are illustrated and described as occurring in a particular order, the present invention contemplates any suitable steps of the method illustrated in FIG. 5 occurring in any suitable order.

Although the present invention has been described with several embodiments, myriad changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented system of repair planning in a supply chain, the system comprising one or more memory units and one or more processing units collectively configured to:
   access an inventory plan representing the supply chain;
   access a replenishment requirement, the replenishment requirement existing at a controlling location in the supply chain; and
   generate a replenishment plan based on the replenishment requirement that meets the inventory plan for the supply chain, the replenishment plan comprising suggested repair orders generated according to one or more rules, wherein unserviceable parts in the supply chain are moved from locations in the supply chain to a repair vendor outside the supply chain and independent of control from the supply chain, repaired at the repair vendor, and moved from the repair vendor back to the supply chain to meet serviceable parts requirements at the locations in the supply chain according to the suggested repair orders, and wherein the suggested repair orders comprises a rule specifying logistics according to lane prioritization to move unserviceable parts and indicating start times to move the unserviceable parts from the supply chain for repair at the repair vendor at the latest possible time that allows the unserviceable parts to be moved from the supply chain to the repair vendor, repaired at the repair vendor, and moved from the repair vendor back to the supply chain in time to meet the serviceable parts requirements at the locations in the supply chain.

2. The system of claim 1, further configured to:
   access information indicating a demand requirement at a first location in the supply chain, the demand requirement resulting from inventory at the first location which is insufficient to fill one or more back orders, sales orders, and forecasted orders at the first location;
   select one or more of the first locations and one or more second locations in the supply chain; and
   generate one or more repair orders according to which one or more unserviceable parts are to be moved from the selected locations to the repair vendor, repaired at the repair vendor, and moved from the repair vendor to the first location to meet the demand requirement at the first location.

3. The system of claim 2, further configured to:
   access information indicating a replenishment requirement at the first location in the supply chain, the replenishment requirement resulting from safety stock at the first location dropping below a predetermined threshold;
   select one or more of the first locations and the one or more second locations in the supply chain; and
   generate one or more repair orders according to which one or more unserviceable parts are to be moved from the selected locations to the repair vendor, repaired at the repair vendor, and moved from the repair vendor to the first location to meet the replenishment requirement at the first location.

4. The system of claim 2, further configured, when an aggregate quantity of unserviceable parts at the first location and the second locations available to meet the demand requirement at the first location is insufficient to fully satisfy the demand requirement at the first location, to indicate a need to procure one or more serviceable parts from one or more vendors outside the supply chain to meet the demand requirement at the first location.

5. The system of claim 2, further configured to select one or more of the second locations only when a quantity of unserviceable parts at the first location available to meet the demand requirement at the first location is insufficient to fully satisfy the demand requirement at the first location.

6. The system of claim 2, further configured to select one or more second locations according to lane prioritization among reverse bill of distributions connecting the second locations to the repair vendor.

7. The system of claim 1, comprising a service parts planning system.

8. A computer-implemented method of repair planning in a supply chain, the method comprising:
    accessing by a computer, an inventory plan representing the supply chain;
    accessing, by the computer, a replenishment requirement, the replenish requirement existing at a controlling location in the supply chain; and
    generating, by the computer, a replenishment plan based on the replenishment requirement that meets the inventory plan for the supply chain, the replenishment plan comprising suggested repair orders generated according to one or more rules, wherein unserviceable parts in the supply chain are moved from locations in the supply chain to a repair vendor outside the supply chain and independent of control from the supply chain, repaired at the repair vendor, and moved from the repair vendor back to the supply chain to meet serviceable parts requirements at the locations in the supply chain according to the suggested repair orders, and wherein the suggested repair orders further comprises a rule specifying logistics according to lane prioritization to move unserviceable parts and indicating start times to move the unserviceable parts from the supply chain for repair at the repair vendor at the latest possible time that allows the unserviceable parts to be moved from the supply chain to the repair vendor, repaired at the repair vendor, and moved from the repair vendor back to the supply chain in time to meet the serviceable parts requirements at the locations in the supply chain.

9. The method of claim 8, further comprising:
    accessing information indicating a demand requirement at a first location in the supply chain, the demand requirement resulting from inventory at the first location which is insufficient to fill one or more back orders, sales orders, and forecasted orders at the first location;
    selecting one or more of the first locations and one or more second locations in the supply chain; and
    generating one or more repair orders according to which one or more unserviceable parts are to be moved from the selected locations to the repair vendor, repaired at the repair vendor, and moved from the repair vendor to the first location to meet the demand requirement at the first location.

10. The method of claim 9, further comprising:
    accessing information indicating a replenishment requirement at the first location in the supply chain, the replenishment requirement resulting from safety stock at the first location dropping below a predetermined threshold;
    selecting one or more of the first locations and the one or more second locations in the supply chain; and
    generating one or more repair orders according to which one or more unserviceable parts are to be moved from the selected locations to the repair vendor, repaired at the repair vendor, and moved from the repair vendor to the first location to meet the replenishment requirement at the first location.

11. The method of claim 9, further comprising, when an aggregate quantity of unserviceable parts at the first location and the second locations available to meet the demand requirement at the first location is insufficient to fully satisfy the demand requirement at the first location, indicating a need to procure one or more serviceable parts from one or more vendors outside the supply chain to meet the demand requirement at the first location.

12. The method of claim 9, further comprising selecting one or more of the second locations only when a quantity of unserviceable parts at the first location available to meet the demand requirement at the first location is insufficient to fully satisfy the demand requirement at the first location.

13. The method of claim 9, further comprising selecting one or more second locations according to lane prioritization among reverse bill of distributions connecting the second locations to the repair vendor.

14. The method of claim 8, executed by a service parts planning system.

15. A non-transitory computer-readable medium embodied with software for repair planning in a supply chain, the software when executed by one or more computers is configured to:
    access an inventory plan representing the supply chain;
    access a replenishment requirement, the replenishment requirement existing at a controlling location in the supply chain; and
    generate a replenishment plan based on the replenishment requirement that meets the inventory plan for the supply chain, the replenishment plan comprising suggested repair orders generated according to one or more rules, wherein unserviceable parts in the supply chain are moved from the locations in the supply chain to a repair vendor outside the supply chain and independent of control from the supply chain, repaired at the repair vendor, and moved from the repair vendor back to the supply chain to meet serviceable parts requirement at the locations in the supply chain according to the suggested repair orders, and wherein the suggested repair orders comprises a rule specifying logistics according to lane prioritization to move unserviceable parts and indicating start times to move the unserviceable parts from the supply chain for repair at the repair vendor at the latest possible time that allows the unserviceable parts to be moved from the supply chain to the repair vendor, repaired at the repair vendor, and moved from the repair vendor back to the supply chain in time to meet the serviceable parts requirement at the locations in the supply chain.

16. The computer-readable medium of claim 15, further configured to:
    access information indicating a demand requirement at a first location in the supply chain, the demand requirement resulting from inventory at the first location which is insufficient to fill one or more back orders, sales orders, and forecasted orders at the first location;
    select one or more of the first location and one or more second locations in the supply chain; and
    generate one or more repair orders according to which one or more unserviceable parts are to be moved from the selected locations to the repair vendor, repaired at the repair vendor, and moved from the repair vendor to the first location to meet the demand requirement at the first location.

17. The computer-readable medium of claim 16, further configured to:
- access information indicating a replenishment requirement at the first location in the supply chain, the replenishment requirement resulting from safety stock at the first location dropping below a predetermined threshold;
- select one or more of the first location and the one or more second locations in the supply chain; and
- generate one or more repair orders according to which one or more unserviceable parts are to be moved from the selected locations to the repair vendor, repaired at the repair vendor, and moved from the repair vendor to the first location to meet the replenishment requirement at the first location.

18. The computer-readable medium of claim 16, further configured, when an aggregate quantity of unserviceable parts at the first location and the second locations available to meet the demand requirement at the first location is insufficient to fully satisfy the demand requirement at the first location, to indicate a need to procure one or more serviceable parts from one or more vendors outside the supply chain to meet the demand requirement at the first location.

19. The computer-readable medium of claim 16, further configured to select one or more of the second locations only when a quantity of unserviceable parts at the first location available to meet the demand requirement at the first location is insufficient to fully satisfy the demand requirement at the first location.

20. The computer-readable medium of claim 16, further configured to select one or more second locations according to lane prioritization among reverse bill of distributions connecting the second locations to the repair vendor.

21. The computer-readable medium of claim 15, wherein the software is a component of a service parts planning system.

* * * * *